United States Patent

McCaffrey et al.

(10) Patent No.: US 10,174,624 B1
(45) Date of Patent: Jan. 8, 2019

(54) COMPOSITE BLADE ROOT LAY-UP

(71) Applicant: United Technologies Corporation, Hartford, CT (US)

(72) Inventors: Michael G. McCaffrey, Windsor, CT (US); Kevin L. Rugg, Fairfield, CT (US); Michael G. Abbott, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 888 days.

(21) Appl. No.: 14/721,393

(22) Filed: May 26, 2015

Related U.S. Application Data

(60) Provisional application No. 62/008,040, filed on Jun. 5, 2014.

(51) Int. Cl.
*F01D 5/28* (2006.01)

(52) U.S. Cl.
CPC .................... *F01D 5/282* (2013.01)

(58) Field of Classification Search
CPC .................. F01D 5/282; F01D 5/30
USPC ..................................... 416/241 A
See application file for complete search history.

(56) References Cited

U.S. PATENT DOCUMENTS

| | | | | |
|---|---|---|---|---|
| 3,679,324 A * | 7/1972 | Stargardter | ............. | B29C 70/20 416/229 A |
| 3,731,360 A * | 5/1973 | Stone, Jr. | ................ | B23P 15/04 29/889.71 |
| 3,752,600 A * | 8/1973 | Walsh | ..................... | F01D 5/282 415/217.1 |
| 3,756,745 A * | 9/1973 | Alver | ..................... | F01D 5/282 416/219 R |
| 4,040,770 A * | 8/1977 | Carlson | ................... | C22C 47/00 416/230 |
| 5,375,978 A * | 12/1994 | Evans | ..................... | B64C 11/26 416/224 |
| 5,573,377 A | 11/1996 | Bond et al. | | |
| 7,754,126 B2 * | 7/2010 | Subramanian | ........ | C04B 35/573 264/258 |
| 2008/0187441 A1* | 8/2008 | Schreiber | ............. | B29C 70/202 416/229 R |
| 2010/0054938 A1* | 3/2010 | Beckford | ................ | F01D 5/147 416/2 |
| 2012/0051920 A1* | 3/2012 | McCaffrey | ............. | F01D 5/282 416/219 R |
| 2013/0247586 A1 | 9/2013 | Luczak | | |
| 2014/0099484 A1 | 4/2014 | Roberts, III et al. | | |

FOREIGN PATENT DOCUMENTS

WO     2015057369     4/2015

OTHER PUBLICATIONS

Beer, Johnston, Jr. and DeWolf, Mechanics of Materials, McGraw-Hill Higher Education, 3rd edition, p. 746-747.*

* cited by examiner

*Primary Examiner* — Aaron R Eastman

(74) *Attorney, Agent, or Firm* — Carlson, Gaskey & Olds, P.C.

(57) ABSTRACT

A blade for a gas turbine engine includes composite layers that include a uni-directional layer and a fabric compliant wedge layer that are arranged adjacent to the uni-directional layer. The fabric compliant wedge layer has a reduced compressive Young's modulus compared to the uni-directional layer.

20 Claims, 2 Drawing Sheets

COMPOSITE BLADE ROOT LAY-UP

CROSS-REFERENCE TO RELATED APPLICATIONS

This application claims priority to U.S. Provisional Application No. 62/008,040, which was filed on Jun. 5, 2014 and is incorporated herein by reference.

BACKGROUND

This disclosure relates to rotors that have blades which are mounted in slots in a rotor disc. More particularly, the disclosure relates to the lay-up of composite layers in an area of blade attachment.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Rotors, such as turbine rotors in gas turbine engines, typically include a disc that has axially extending slots around its periphery for mounting turbine blades. The slots have a "toothed" profile and each of the blades has a root with a corresponding profile to interlock with the toothed profile of the slots. In applications in which the blade is constructed from multiple layers forming a ceramic matrix composite, the root typically is provided by a simple dovetail geometry.

High Strength ceramic matrix composite (CMC) blades use uni-directional weaves and/or tapes because the layup can use radially biased fiber orientation with some dispersed angular aligned plies. This type of layup architecture is known to create a layup with substantially higher strength in the primary load direction, than a comparable 2D or 3D woven cloth layup. The planar layers of uni-directional weave also results in CMC components with substantially less through-thickness porosity than comparable CMC component made from 2D and 3D woven layups, due to the absence of tow-to-tow overlap within the layer/ply.

Stacked layups of uni-directional plies, due to their lower porosity and the absence of tow-to-tow overlap, demonstrate substantially higher through-thickness compressive Young's Modulus (sometimes referred to as "E33") than layups created with 2D and 3D weaves. Blade attachments bearing surfaces experience high compressive loads due to the radial constraint imposed by the disk attachment. The compressive load distribution on the blade root is a function of the compressive compliance of the blade and disk features. If the load is unable to distribute over a large enough area, load concentration occurs, and local overstress may result in premature fracture of the blade root or disk attachment.

Typically, a CMC blade has very low porosity, for example, less than 5%. It has generally been desirable to process the CMC to reach a density that approaches the theoretical density of the material, that is, without voids or porosity. Historically, a compliant layer has been used to separate the CMC/ceramic blade from the metallic disk. Although successful, this thin layer has limited ability to distribute load through local compressive yielding. The limiting component remains to be the blade root region. One technique for mitigating stress is to secure metallic pads near the neck and fillet. Another technique for mitigating stress is to provide wedges that float with respect to the slot and the blade tooth.

SUMMARY

In one exemplary embodiment, a blade for a gas turbine engine includes composite layers that include a uni-directional layer and a fabric compliant wedge layer that are arranged adjacent to the uni-directional layer. The fabric compliant wedge layer has a reduced compressive Young's modulus compared to the uni-directional layer.

In a further embodiment of the above, the composite layers are provided by a matrix composite material.

In a further embodiment of any of the above, the matrix composite material is integrated with fibers.

In a further embodiment of any of the above, a neck flares to a root. The uni-direction layer extends through the neck and the root. The fabric compliant wedge layer is provided in the root. The uni-directional layer and the compliant wedge layer are integrated into a unitary matrix composite structure.

In a further embodiment of any of the above, the fabric compliant wedge layer extends axially to an end face of the root.

In a further embodiment of any of the above, the uni-direction layer extends in a generally radial direction to provide an airfoil.

In a further embodiment of any of the above, the uni-direction layer includes a matrix composite material that has fibers that extend in the radial direction. The fabric compliant wedge layer includes a matrix composite material that has fibers that extend in a direction transverse to the radial direction.

In a further embodiment of any of the above, the fabric compliant wedge layer is woven.

In a further embodiment of any of the above, the fabric compliant wedge layer is non-woven.

In a further embodiment of any of the above, the fabric compliant wedge layer has a tapered cross-section.

In a further embodiment of any of the above, the fabric compliant wedge layer is 50%-90% of theoretical density.

In a further embodiment of any of the above, the fabric compliant wedge layer has a compressive Young's modulus less than 75% of the uni-directional layer In a further embodiment of any of the above, the fabric compliant wedge layer has a compressive Young's modulus in the range of 25-50% of the uni-directional layer.

In another exemplary embodiment, a rotating stage of a gas turbine engine includes a rotor that includes a slot. A blade has a root that is received in the slot and a neck flaring to the root. The blade has composite layers including a uni-directional layer and a fabric compliant wedge layer that is arranged adjacent to the uni-directional layer. The uni-direction layer extends through the neck and the root. The fabric compliant wedge layer is provided in the root. The uni-directional layer and the compliant wedge layer are integrated into a unitary matrix composite structure. The uni-direction layer extends in a radial direction to provide an airfoil. The uni-direction layer includes a matrix composite material that has fibers that extend in the generally radial direction. The fabric compliant wedge layer includes a matrix composite material that has fibers that extend in a direction transverse to the radial direction. The fabric compliant wedge layer has a reduced compressive Young's modulus compared to the uni-directional layer.

In a further embodiment of the above, the composite layers are provided by a matrix composite material. The matrix composite material is integrated with the fibers.

In a further embodiment of any of the above, the fabric compliant wedge layer extends axially to an end face of the root. The fabric compliant wedge layer has a tapered cross-section.

In a further embodiment of any of the above, the fabric compliant wedge layer is 50%-90% of theoretical density.

In a further embodiment of any of the above, the fabric compliant wedge layer has a compressive Young's modulus less than 75% of the uni-directional layer In a further embodiment of any of the above, the fabric compliant wedge layer has a compressive Young's modulus in the range of 25-50% of the uni-directional layer.

In another exemplary embodiment, a component for a gas turbine engine includes composite layers including a uni-directional layer and a fabric compliant layer that are arranged adjacent to the uni-directional layer. The uni-directional layer and the compliant layer are integrated into a unitary matrix composite structure. The matrix composite material is integrated with fibers. The uni-direction layer includes the fibers that extend in a generally first direction. The fabric compliant wedge layer includes a matrix composite material that has the fibers that extend in a second direction transverse to the first direction. The fabric compliant layer has an increased porosity compared to the uni-directional layer. The fabric compliant wedge layer is 50%-90% of theoretical density. The fabric compliant wedge layer has a compressive Young's modulus less than 75% of the uni-directional layer.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
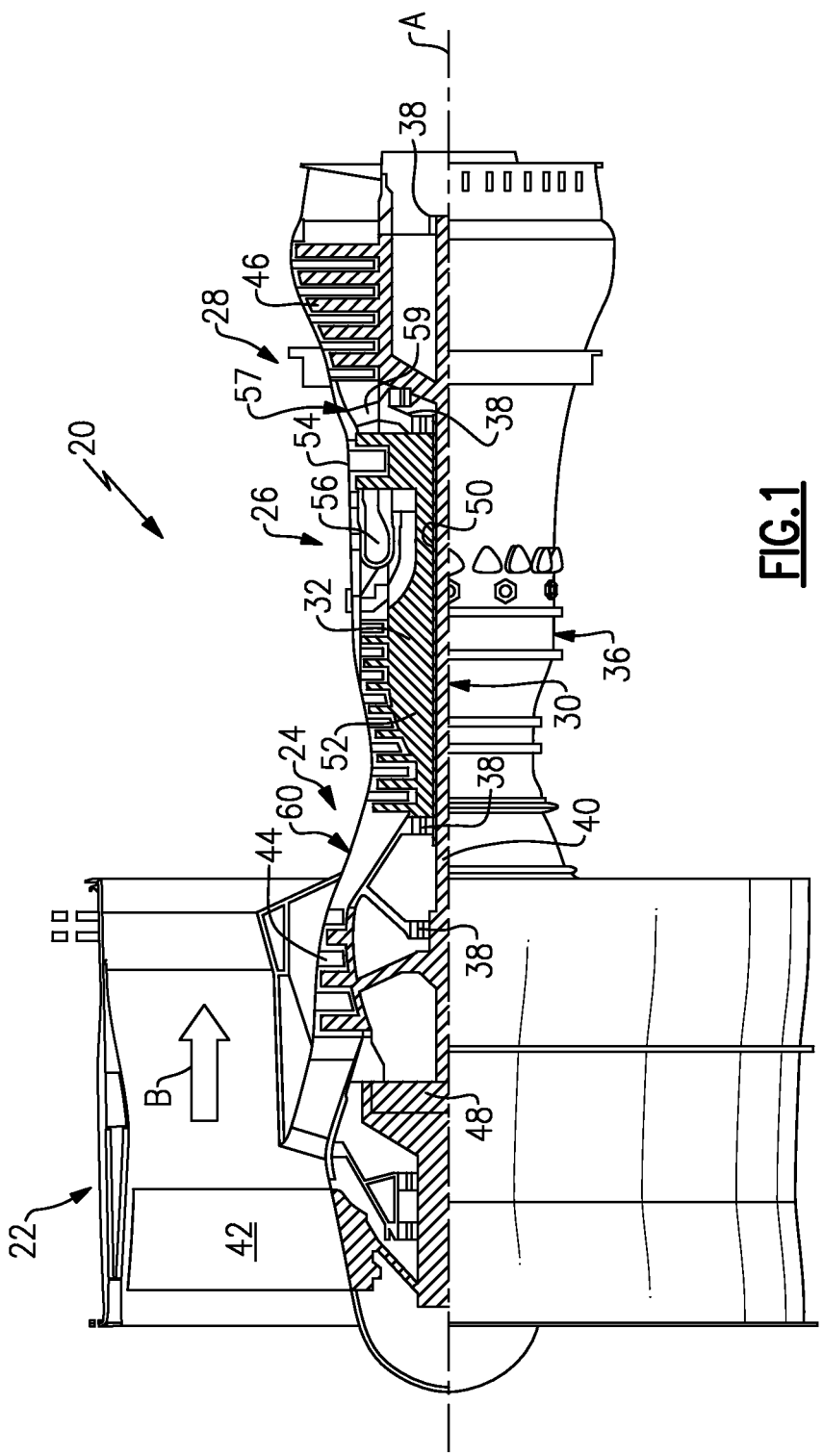
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft. (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ram} °R)/(518.7°R)]^{0.5}$. The "Low corrected fan tip speed" as disclosed herein according to one non-limiting embodiment is less than about 1150 ft/second (350.5 meters/second).

Figure 2:
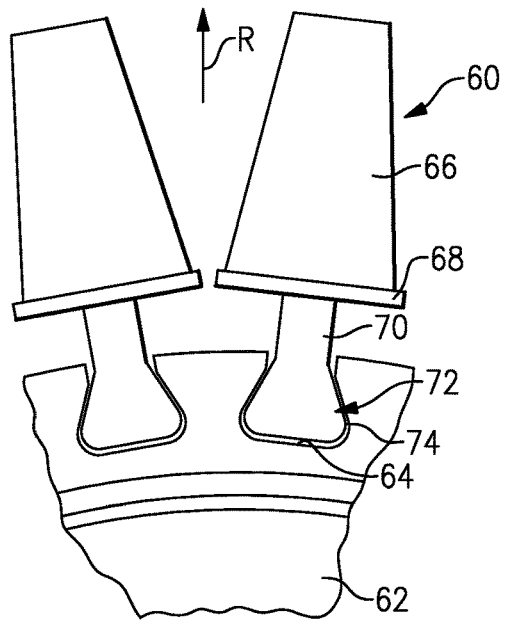
FIG. 2 schematically illustrates an example rotor having blades mounted thereto.

Referring to FIG. 2, blades 60 are shown supported on a rotor 62 within slots 64. The blade 60 includes an airfoil 66 extending in a radial direction R from a platform 68. The platform 68 is supported by a neck 70 and provides an inner gas flow path surface of a core flow path within the gas turbine engine 10. A root 72 is provided on the neck 70 opposite the platform 68. The platform may be omitted if desired. The root 72, which has a dovetail shape in the example, is received in the slot 64. The root 72 includes circumferentially spaced apart teeth 74, which transfer the pulling force F (FIG. 3) on the blade 60 to the rotor 62. It should be understood that other blade and rotor arrangements may be used. The blades may be provided in a compressor section or a turbine section.

Figure 3:
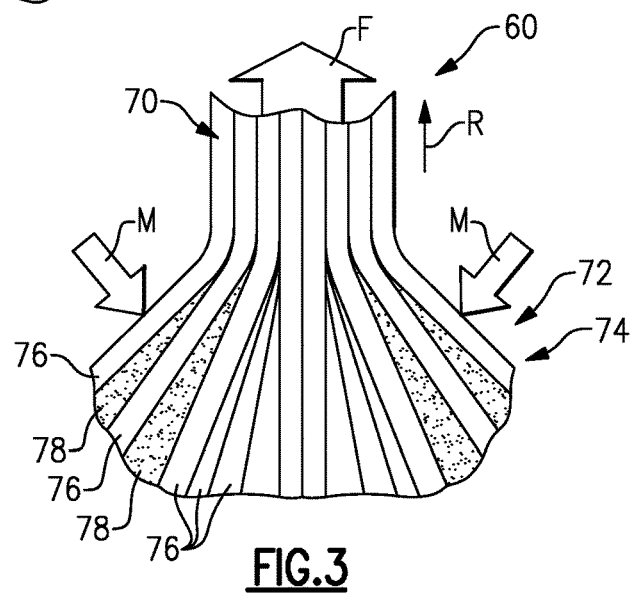
FIG. 3 illustrates a blade root.

Referring to FIG. 3, the blade includes uni-directional layers 76 having fibers generally oriented in the radial direction R, for example, +/−45° within the radial direction. The uni-directional layers 76 extend to provide the airfoil 66. Since the neck 70 transitions to a dovetail-shaped root 72, which is flared relative to the neck 70, wedges are used to separate adjacent layer. At least some of the wedges may be provided by one or more compliant wedge layers 78 in each tooth 74. Layers adjacent to the compliant wedge layers 78 may be oriented up to around +/−30°, for example, although other orientations may also be used. In the example, the compliant wedge layers 78 are the outermost wedges within the root 72. The compliant wedge layers 78 extend to an axial end face of the root 72. In an example, the compliant wedge layers have a tapered cross-section.

Figure 4:
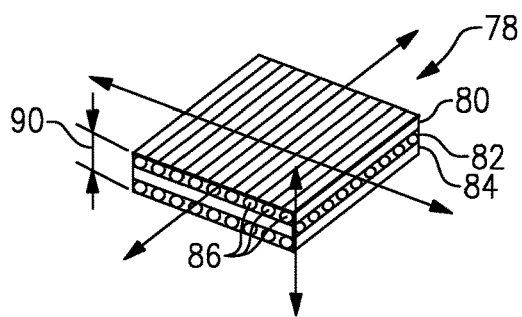
FIG. 4 is a perspective view of one compliant layer for the blade root.

The composite layers, which include the uni-directional layer 76 and the compliant wedge layer 78 are provided by matrix composite material in which the matrix composite material is integrated with fibers. The uni-directional layer 76 and the compliant wedge layer 78 are integrated into a unitary matrix composite structure in the final component. The compliant wedge layers 78 may be constructed from a 2D or 3D fabric, illustrated in FIG. 4. The fabric may be woven or non-woven. The fabric has multiple plies 80, 82, 84, each including fibers 86, which may be SiC, for example. Other types of fibers may be used, if desired. The fibers in each ply are oriented transverse to the fibers in the adjacent ply of the layer. The number of plies is determined by a desired thickness 90 and the size of the fibers, for example.

The layers can be processed in any suitable manner to produce an organic matrix composite (OMC) or a ceramic matrix composite (CMC) blade. The composite lay-up is processed by pyrolyzing a pre-ceramic polymer and heating assembly. A variety of other steps may be used, depending upon the material and desired properties, for example. The assembly may be further processed to increase the density of the blade. The construction of the fabric wedge layer ensures that the compliant wedge layers remain somewhat porous compared to the theoretical density, for example, 50%-90% of theoretical density. Moreover, the fabric promotes the formation of increased porosity during manufacturing compared to the uni-directional layers and provides a reduced compressive Young's modulus compared to the uni-directional layer. In one example, the compliant wedge layer has a compressive Young's modulus of less than 75% of the uni-directional layer, and in another example, in the range of 25-50% of the uni-directional layer. In one example, the theoretical density of the wedge layers provides a compressive Young's modulus of 20 Mpsi (138 GPa) or greater. The compressive Young's modulus of the compliant wedge layers 78 is less than 15 Mpsi (103 GPa), for example, and in the range of 5-10 Mpsi (34-69 GPa) in another example.

The compliant wedge layers 78 provide a blade root construction that introduces regions of controlled, reproducible layers of comparatively lower through-thickness, compressive Young's modulus. Preformed wedges, made from 2D and/or 3D fabric are included in the biased, uni-directional layup, creating some regions with lower through-thickness compressive Young's modulus. Increasing the internal compliance of the blade root region will lower the peak concentrated stresses on the outer layers of the CMC blade, thus increasing the load capability of the attachment with no increase in section volume. Non-detrimental voids are provided, introducing internal compliance at the critical bearing surface and compressive zone within the blade attachment, while preserving the beneficial structural capability of the bias, unidirectional layers. Separate compliant layers external to the CMC blade may be eliminated.

The disclosed compliant layer may also be used for other composite components where local compressive loads can be distributed into the structure, with a lower overall stress concentration at the attachment features. In such applications, one or more compliant layers constructed from a 2D or 3D fabric are arranged adjacent one or more uni-directional layers. The compliant layer is 50%-90% of theoretical density.

A component for a gas turbine engine includes composite layers including uni-directional layer and a fabric compliant layer arranged adjacent to the uni-directional layer. The uni-directional layer and the compliant layer are integrated into a unitary matrix composite structure. The matrix composite material is integrated with fibers. The uni-direction layer includes the fibers that extend in a generally first direction. The fabric compliant wedge layer includes a matrix composite material that has the fibers that extend in a second direction transverse to the first direction. The fabric compliant layer has an increased porosity compared to the uni-directional layer. The fabric compliant wedge layer is 50%-90% of theoretical density. The fabric compliant wedge layer has a compressive Young's modulus of less than 75% of the uni-directional layer.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A blade for a gas turbine engine, the blade having a neck flaring to a root, the blade comprising:
composite layers including uni-directional layers extending through the neck and the root, the uni-directional layers having adjacent surfaces spaced apart circumferentially from one another by a wedge-shaped gap that extends from an apex to an innermost radial end of the root, and a fabric compliant wedge layer arranged in the gap and joining the adjacent surfaces of the uni-directional layers, the fabric compliant wedge layer is uninterrupted in extending circumferentially at the innermost radial end to join the adjacent surfaces, the fabric compliant wedge layer has a reduced compressive Young's modulus compared to the uni-directional layers.

2. The blade according to claim 1, wherein the composite layers are provided by a matrix composite material.

3. The blade according to claim 2, wherein the matrix composite material is integrated with fibers.

4. The blade according to claim 2, wherein the fabric compliant wedge layer is provided in the root, the uni-directional layers and the compliant wedge layer are integrated into a unitary matrix composite structure.

5. The blade according to claim 4, wherein the fabric compliant wedge layer extends axially to an end face of the root.

6. The blade according to claim 1, wherein the uni-direction layers extend in a generally radial direction to provide an airfoil.

7. The blade according to claim 6, wherein uni-direction layers includes a matrix composite material having fibers extending in the radial direction, and the fabric compliant wedge layer includes a matrix composite material having fibers extending in a direction transverse to the radial direction.

8. The blade according to claim 7, wherein the fabric compliant wedge layer is woven.

9. The blade according to claim 7, wherein the fabric compliant wedge layer is non-woven.

10. The blade according to claim 1, wherein the fabric compliant wedge layer has a tapered cross-section.

11. The blade according to claim 1, wherein the fabric compliant wedge layer is 50%-90% of theoretical density.

12. The blade according to claim 11, wherein the fabric compliant wedge layer has a compressive Young's modulus less than 75% of the uni-directional layers.

13. The blade according to claim 12, wherein the fabric compliant wedge layer has a compressive Young's modulus in the range of 25-50% of the uni-directional layers.

14. A rotating stage of a gas turbine engine comprising:
a rotor including a slot; and
a blade having a root received in the slot, and a neck flaring to the root, the blade having composite layers including uni-directional layers extending through the neck and the root, the uni-directional layers having adjacent surfaces spaced apart circumferentially from one another by a wedge-shaped gap that extends from an apex to an innermost radical end of the root, and a fabric compliant wedge layer arranged in the gap and joining the adjacent surfaces of the uni-directional layers, the uni-direction layer extending through the neck and the root, and the fabric compliant wedge layer provided in the root, the uni-directional layers and the fabric compliant wedge layer are integrated into a unitary matrix composite structure, wherein the uni-direction layers extends in a radial direction to provide an airfoil, wherein uni-direction layers include a matrix composite material having fibers extending in the generally radial direction, and the fabric compliant wedge layer is uninterrupted in extending circumferentially at the innermost radial end to join the adjacent surfaces, the fabric compliant wedge layer includes a matrix composite material having fibers extending in a direction transverse to the radial direction, the fabric compliant wedge layer has a reduced compressive Young's modulus compared to the uni-directional layers.

15. The rotating stage according to claim 14, wherein the composite layers are provided by a matrix composite material, wherein the matrix composite material is integrated with the fibers.

16. The rotating stage according to claim 14, wherein the fabric compliant wedge layer extends axially to an end face of the root, wherein the fabric compliant wedge layer has a tapered cross-section.

17. The rotating stage according to claim 14, wherein the fabric compliant wedge layer is 50%-90% of theoretical density.

18. The rotating stage according to claim 17, wherein the fabric compliant wedge layer has a compressive Young's modulus less than 75% of the uni-directional layer.

19. The rotating stage according to claim 18, wherein the fabric compliant wedge layer has a compressive Young's modulus in the range of 25-50% of the uni-directional layer.

20. A component for a gas turbine engine comprising:
composite layers including uni-directional layers extending through the neck and the root, the uni-directional layers having adjacent surfaces spared apart circumferentially from one another by a wedge-shaped gap that extends from an apex to an innermost radial end of the root, and a fabric compliant wedge layer arranged in the gap and joining the adjacent surfaces of the uni-directional layers, the uni-directional layer and the fabric compliant wedge layer are integrated into a unitary matrix composite structure, wherein the matrix composite material is integrated with fibers, wherein uni-direction layers include the fibers extending in a generally first direction, and the fabric compliant wedge layer is uninterrupted in extending circumferentially at the innermost radial end to join the adjacent surfaces, the fabric compliant wedge layer includes a matrix composite material having the fibers extending in a second direction transverse to the first direction, the fabric compliant layer has an increased porosity compared to the uni-directional layers, the fabric compliant wedge layer is 50%-90% of theoretical density, wherein the fabric compliant wedge layer has a compressive Young's modulus less than 75% of the uni-directional layers.

* * * * *